United States Patent [19]
Watanabe et al.

[11] Patent Number: 5,906,679
[45] Date of Patent: May 25, 1999

[54] COATING COMPOSITIONS EMPLOYING ZINC ANTIMONATE ANHYDRIDE PARTICLES

[75] Inventors: Yoshitane Watanabe; Keitaro Suzuki; Yoshinari Koyama, all of Funabashi, Japan

[73] Assignee: Nissan Chemical Industries, Ltd., Tokyo, Japan

[21] Appl. No.: 08/939,202

[22] Filed: Sep. 29, 1997

Related U.S. Application Data

[62] Division of application No. 08/711,460, Sep. 11, 1996, Pat. No. 5,707,552, which is a division of application No. 08/254,708, Jun. 6, 1994, abandoned.

[51] Int. Cl.$^6$ .............................. C09D 1/00; C09D 5/18; C08K 3/10; C09K 21/00
[52] U.S. Cl. ...................... 106/286.6; 252/609; 524/410; 524/783; 524/911; 516/91
[58] Field of Search .................................. 252/518, 609, 252/611, 309; 106/286.6, 287.16, 18.12; 260/DIG. 16; 524/911, 410, 780, 783; 516/91

[56] References Cited

U.S. PATENT DOCUMENTS

| | | | |
|---|---|---|---|
| 1,211,564 | 1/1917 | Eyer | 423/593 |
| 2,329,161 | 9/1943 | Harbert et al. | 423/87 |
| 4,110,247 | 8/1978 | Gower, II et al. | 252/313.1 |
| 4,169,104 | 9/1979 | Burt et al. | 252/608 |
| 4,362,658 | 12/1982 | Contin | 252/609 |
| 4,608,198 | 8/1986 | Watanabe et al. | 252/609 |
| 4,731,198 | 3/1988 | Watanabe et al. | 252/313.1 |
| 4,770,813 | 9/1988 | Watanabe et al. | 252/309 |
| 5,091,457 | 2/1992 | Efner | 524/410 |
| 5,190,700 | 3/1993 | Watanabe et al. | 252/609 |
| 5,368,995 | 11/1994 | Christian et al. | 430/530 |

FOREIGN PATENT DOCUMENTS

| | | |
|---|---|---|
| 0 250 154 | 12/1987 | European Pat. Off. . |
| A-52-21298 | 2/1977 | Japan . |
| B2-57-11848 | 3/1982 | Japan . |
| A-60-41536 | 3/1985 | Japan . |
| B2-61-3292 | 1/1986 | Japan . |
| A-62-125849 | 6/1987 | Japan . |
| A-62-182116 | 8/1987 | Japan . |
| A-3-267143 | 11/1991 | Japan . |

OTHER PUBLICATIONS

Westin et al., "On the formation of M2+Sb3+–alkoxide precursors and sol–gel . . . ", *Journal of Materials Science* 27 (1992), pp. 1617–1625.

"Properties of Sb–compounds with Rutile–Like Structures", *Acta Chemica Scandinavica A*, J.D. Donaldson et al., 1975, vol. 29. pp. 803–809.

"X–Ray Powder Data for Ore Minerals: The Peacock Atlas", *The Geological Society of Amer. Menoir* 85, L.G. Berry et al., 1962, p. 209.

"Ordonezite, Zinc Antimonate, A New Mineral From Guanajuato, Mexico", *American Mineralogist*, George Switzer, et al., 1955, vol. 98, pp. 64–69.

(List continued on next page.)

*Primary Examiner*—Richard D. Lovering
*Assistant Examiner*—Daniel S. Metzmaier
*Attorney, Agent, or Firm*—Oliff & Berridge, PLC

[57] ABSTRACT

The invention relates to coating compositions employing zinc antimonate anhydride comprising zinc antimonate anhydride particles and a liquid of a part-hydrolyzed silane coupling agent, a liquid of hydrolyzed ethylsilicate, a liquid of hydrolyzed methylsilicate, or a resin emulsion. The zinc antimonate anhydride particle having a $ZnO/Sb_2O_5$ molar ratio in a range of from 0.8 to 1.2, a crystal structure of zinc antimonate anhydride ($Zn\,Sb_2O_5$), and a primary particle size in a range of from 5 to 500 nm. The particle production method comprises the steps of mixing a zinc compound with a colloidal antimony oxide at a $ZnO/Sb_2O_5$ molar rate in a range of from 0.8 to 1.2, followed by calcining the mixture within a temperature range of from 500 to 1100° C. The particles are applicable as a flame retardant for plastics, a smoke suppressant, antistatic agent for plastics and glasses, and resistor.

4 Claims, 4 Drawing Sheets

OTHER PUBLICATIONS

"The Crystal Structure of Zinc Meta–Antimonate", *Zeitschr.f. Kristallographie.,* G.L. Clark et al., vol. 98, pp. 185–190, (1937).

ASTM No. 3–0452, "X–Ray Powder Data File", *American Society for Testing Materials,* ASTM Special Technical Publication 48–J, Date Unknown.

ASTM No. 11–214, "Powder Diffraction File", *Joint Committee on Powder Diffraction Standards,* Inorganic vol., No. PDIS–15iRB, Date Unknown.

*Kirk–Othmer Encyclopedia of Chemical Technology*, 3rd Ed., vol. 17 (John Wiley & Sons, N.Y., N.Y.), pp. 795–796, (Copyright 1982), Oct. 1983.

COATING COMPOSITIONS EMPLOYING ZINC ANTIMONATE ANHYDRIDE PARTICLES

This is a Division of application Ser. No. 08/711,460 filed Sep. 11, 1996, now U.S. Pat. No. 5,707,552, which in turn is a Division of application Ser. No. 08/254,708 filed Jun. 6, 1994, now abandoned.

BACKGROUND

The present invention relates to a particle having a molar ratio of $ZnO/Sb_2O_5$ in a range of from 0.8 to 1.2, having a crystal structure of zinc antimonate anhydride ($ZnSb_2O_6$) and a primary particle size in the range of from 5 to 500 nm, and to a sol of these particles and a method for producing these particles and sol. The particle of the present invention is used in a variety of applications such as flame retardants for plastics, smoke suppressants, antistatic agents for plastics and glass, and resistors.

Acta Chemica Scandinavia, A, Vol. 29, pp. 803–809 (1975) discloses a zinc antimonate ($ZnSb_2O_6$) prepared by heating zinc oxide and diantimony trioxide to 800° C. at a time scale of 4 hours to 3 weeks, by pulverizing the heated mixture, annealing the pulverized mixture at a temperature ranging from 900 to 1,000° C. at a time scale of 4 hours to 2 weeks, and gradually cooling the annealed mixture to room temperature. Zeitschrift fuer Kristallographie, Vol. 98, pp. 185–190 1937 presents observation data of X-ray diffraction of zinc antimonate anhydride $\{Zn(SbO_3)_2\}$. American Mineralogist, Vol. 40, pp 64–69 (1955), and Geological Society of America Memoir, Vol. 85, pp. 209 (1962) present observation data of X-ray diffraction of zinc antimonate anhydride ($ZnSb_2O_6$, Ordonezite).

JP-A-3-267143 (the term "JP-A-" referred to hereinafter signifies "unexamined Japanese patent publication") discloses a composition consisting of zinc oxide and diantimony pentoxide which was prepared by mixing an acidic aqueous sol of diantimony pentoxide and basic zinc carbonate at a molar ratio of $ZnO/Sb_2O_5$ in a range of from 0.5 to 10 to form a uniformly dispersed slurry, performing decarbonation of the basic zinc carbonate in the slurry at a temperature range of from 50 to 100° C. to a molar ratio of $CO_3/ZnO$ in a range of from 1/5 to 1/500, and by drying the slurry in a temperature range of from 150 to 250° C.

The method disclosed in Acta Chemica Scandinavia described above produces zinc antimonate anhydride by mixing zinc oxide and diantimony trioxide and by calcining the mixture. The particle size of the obtained zinc antimonate anhydride is, however, not given in the description. Since ordinary diantimony trioxide has a large primary particle size, the primary particle size of zinc antimonate anhydride obtained by this method is 500 nm or more. Accordingly, when particles of this type are used as a flame retardant or smoke suppressant, they do not provide a completely satisfactory effect. In addition, particles of this type have the disadvantage of not providing a sol even by pulverizing, because of their large primary particle size. The method disclosed in JP-A-3-267143 employs a low calcining temperature so that the product has a primary particle size of 500 nm or less. Nevertheless, X-ray diffraction measurement shows a peak of diantimony pentoxide and not a peak of zinc antimonate anhydride. Consequently, the product thereof is not zinc antimonate anhydride.

The present invention provides a particle having a molar ratio of $ZnO/Sb_2O_5$ in a range of from 0.8 to 1.2, a crystal structure of zinc antimonate anhydride ($ZnSb_2O_6$) and a primary particle size in the range of from 5 to 500 nm, relates to a sol of these particles and a method for producing these particles and their sol.

SUMMARY

The particle of the present invention has a molar ratio of $ZnO/Sb_2O_5$ in the range of from 0.8 to 1.2, a crystal structure of zinc antimonate anhydride ($ZnSb_2O_6$), and a primary particle size in the range of from 5 to 500 nm.

The production method of the particles of the present invention is characterized by mixing a zinc oxide and a colloidal antimony oxide at a molar ratio of $ZnO/Sb_2O_5$ in a range of from 0.8 to 1.2, followed by calcining the mixture in a temperature range of from 500 to 1,100° C.

According to the production method of the particles of the present invention, when the colloidal antimony oxide is an antimony oxide sol, it is mixed with a zinc compound, and the mixture is dried and calcined at a temperature ranging from 500 to 1,100° C. to obtain the required particles.

The zinc compound used in the present invention is one zinc compound or more selected from a group of zinc hydroxide, zinc oxide, a zinc salt of inorganic acid, and a zinc salt of organic acid.

Examples of a zinc salt of inorganic acid are zinc carbonate, basic zinc carbonate, zinc nitrate, basic zinc nitrate, zinc chloride, basic zinc chloride, zinc sulfate, and basic zinc sulfate. Examples of a zinc salt of organic acid are zinc formate, zinc acetate, zinc oxalate, and basic zinc oxalate. These zinc compounds are available as commercially available industrial chemicals. However, when zinc hydroxide or zinc oxide is used, it is preferable to use those having a primary particle size of 500 nm or less, and to use zinc hydroxide powder, zinc oxide powder, zinc hydroxide sol or zinc oxide sol having a particle size in the colloidal range. It is more preferable still to use a salt having an acid radical which volatilizes during calcining, a carbonate, a nitrate or a salt of organic acid. Those compounds may be used in an alone or a mixture.

The colloidal antimony oxide used in the present invention has a primary particle size of 300 nm or less, and examples of a compound thereof are diantimony pentoxide sol, hexantimony tridecoxide sol, diantimony tetroxide hydrate sol, and colloidal diantimony trioxide. Diantimony pentoxide sol may be prepared by a known method, including a method for oxidizing diantimony trioxide (disclosed in JP-B-57-11848) (the term "JP-B-" referred to hereinafter signifies "Examined Japanese Patent Publication"), a method of de-alkalizing alkali metal antimonate by means of an ion exchange resin (disclosed in U.S. Pat. No. 4,110,247), and a method for treating sodium antimonate by means of an acid (disclosed in JP-A-60-41536, JP-A-62-182116). Hexantimony tridecoxide sol may be prepared by a method for oxidizing diantimony trioxide (disclosed in JP-A-62-125849), and diantimony tetroxide hydrate may also be prepared by a method for oxidizing diantimony trioxide (disclosed in JP-A-52-21298). Colloidal diantimony trioxide may be produced by a vapor phase process (disclosed in JP-B-61-3292). The antimony oxide sol used in this invention preferably has a primary particle size ranging from 2 to 200 nm and is preferably an acidic sol containing no base such as sodium or amine. Antimony oxide sol may use that which contains an antimony oxide ($Sb_2O_5$, $Sb_6O_{13}$, or $Sb_2O_4$) at a concentration of from 1 to 60 wt. %, and the sol may be dried by a vacuum drying method or a freeze drying method to be used as a dried product of antimony oxide sol. The colloidal antimony oxide is available as a commercial industrial chemical in a form of diantimony pentoxide sol, diantimony pentoxide powder or diantimony trioxide ultrafine powder.

Mixing of the above-described zinc compound and antimony oxide sol may be conducted in a temperature range of from 0 to 100° C. for a mixing time ranging from 0.1 to 30 hours using a Satake agitator, Pfaudler agitator, disper mill, or the like. Mixing of the zinc compound with the dried antimony oxide sol or the colloidal diantimony trioxide may be performed using a mortar, a V-shape mixer, a Henschel mixer, a ball mill or the like.

In the present invention, it is preferable to mix the zinc compound with the antimony oxide sol or a dried product thereof, or with the colloidal diantimony trioxide at a molar ratio of $ZnO/Sb_2O_5$ in a range of from 0.8 to 1.2. According to the present invention, the drying procedure of the above-described mixture (slurry) of zinc compound and antimony oxide sol may be performed at 500° C. or below using a spray drier, a drum drier, a box hot air circulation drier, a vacuum drier, or a freeze drier. Also, the slurry may be dried by separating the cake using a suction filtration unit, a centrifugal filtration unit or a filter press, or further by removing soluble impurities (such as $SO_4$, which is hard to volatilize during calcining) by pouring a pure water from the starting materials at need to form a wet cake, and by drying the cake within a temperature range of from room temperature to 500° C. using a box drier or other type of drier described above. The drying procedure is preferably conducted at 300° C. or below in consideration of the characteristics of the drier or operation employed.

According to the present invention, the calcining of the dried mixture of the above-described zinc compound and antimony oxide or the mixture of the above-described zinc compound and dried antimony oxide sol or colloidal diantimony trioxide is conducted within a temperature range of from 500 to 1,100° C., preferably in a range of from 500 to 900° C., for 30 minutes to 50 hours or preferably for 2 to 20 hours. This calcining provides the particles of the present invention by means of a solid phase reaction.

The particle of the present invention becomes a white to bluish green color, depending on calcining conditions.

The particle obtained by the method of the present invention was analyzed by X-ray diffractometry. This analysis showed an X-ray diffraction peak identical to that of antimony oxide ($ZnSb_2O_6$ for ASTM No. 3-0455, and $Zn(SbO_3)_2$ for ASTM No. 11-214) described in ASTM (Index to the X-ray Powder Data File Inorganic) and no X-ray diffraction peak of zinc oxide or diantimony pentoxide anhydride, determining that the particle had the structure of $ZnSb_2O_6$. However, for a calcining temperature range of from 500 to 680° C., the X-ray diffraction peak occurred at the lower diffraction angle side of the peak described in ASTM, which suggested that the particle had an open structure. The peak diffraction angle of the X-ray diffraction peak in the case of a calcining temperature of 680° C. or above also matched the value described in ASTM. A differential thermal analysis (DTA-TG) of the particle of this invention confirmed that the particle showed no weight loss within a temperature range of room temperature to 1,000° C., and that the particle had a crystal structure of zinc antimonate anhydride having no crystal water.

Observation of the particle of the present invention under a transmission electron microscope confirmed that the particle had a primary particle size of from 5 to 500 nm and that the particle was colloidal fine particle. The primary particle size specified in this invention means the diameter of a single particle in a non-aggregated state.

The inventors found a surprising fact in that the particle of this invention obtained by calcining within a temperature range of from 500 to 680° C. show a resistivity ranging from 0.1K Ω to 1M Ω and electric conductivity by way of electron conduction.

Since the particles obtained by this invention showed a very slight sintering effect during calcining, they are easily pulverized to 2 $\mu$m or less even when they are in a aggregated state employing a dry powdering process such as that using a Jet-O-Mizer, a pin-disc mill, or a ball mill. Also, the particles of this invention can easily form an aqueous sol or an organic solvent sol by wet-pulverization in water or an organic solvent using a sand grinder, a ball mill, a homogenizer, a disper, or a colloid mill. It was confirmed that the particle of this invention formed no zinc antimonate hydrate even when pulverized and heated in water, and that they maintained the crystal structure of zinc antimonate anhydride.

When the particles of this invention are subjected to wet-pulverization to form an organic solvent sol containing dispersed particles, the sol may be stabilized by adding, at need, an alkyl amine such as ethylamine, propylamine, isopropylamine, or diisobutylamine, an alkanolamine such as triethanolamine or monoethanolamine, a diamine such as ethylenediamine, or an hydroxy-carboxylic acid such as lactic acid, tartaric acid, malic acid, or citric acid. An alcohol such as methyl alcohol, ethyl alcohol, propyl alcohol, or butyl alcohol, a glycol such as ethyleneglycol, diethyleneglycol, or hexyleneglycol, a cellosolve such as ethylcellosolve or propylcellosolve, and an amide such as dimethylformamide or dimethylacetamide may be used as an organic solvent. The particle size in the above-described aqueous sol or organic solvent sol is 500 nm or less.

DRAWINGS

These and other features, aspects and advantages of the present invention will become better understood with reference to the following description, appended claims and accompanying drawings, wherein FIG. 1 is a photograph of particles prepared in Example 5, taken by a transmission electron microscope with a magnification of 200,000.

DESCRIPTION

Figure 1:
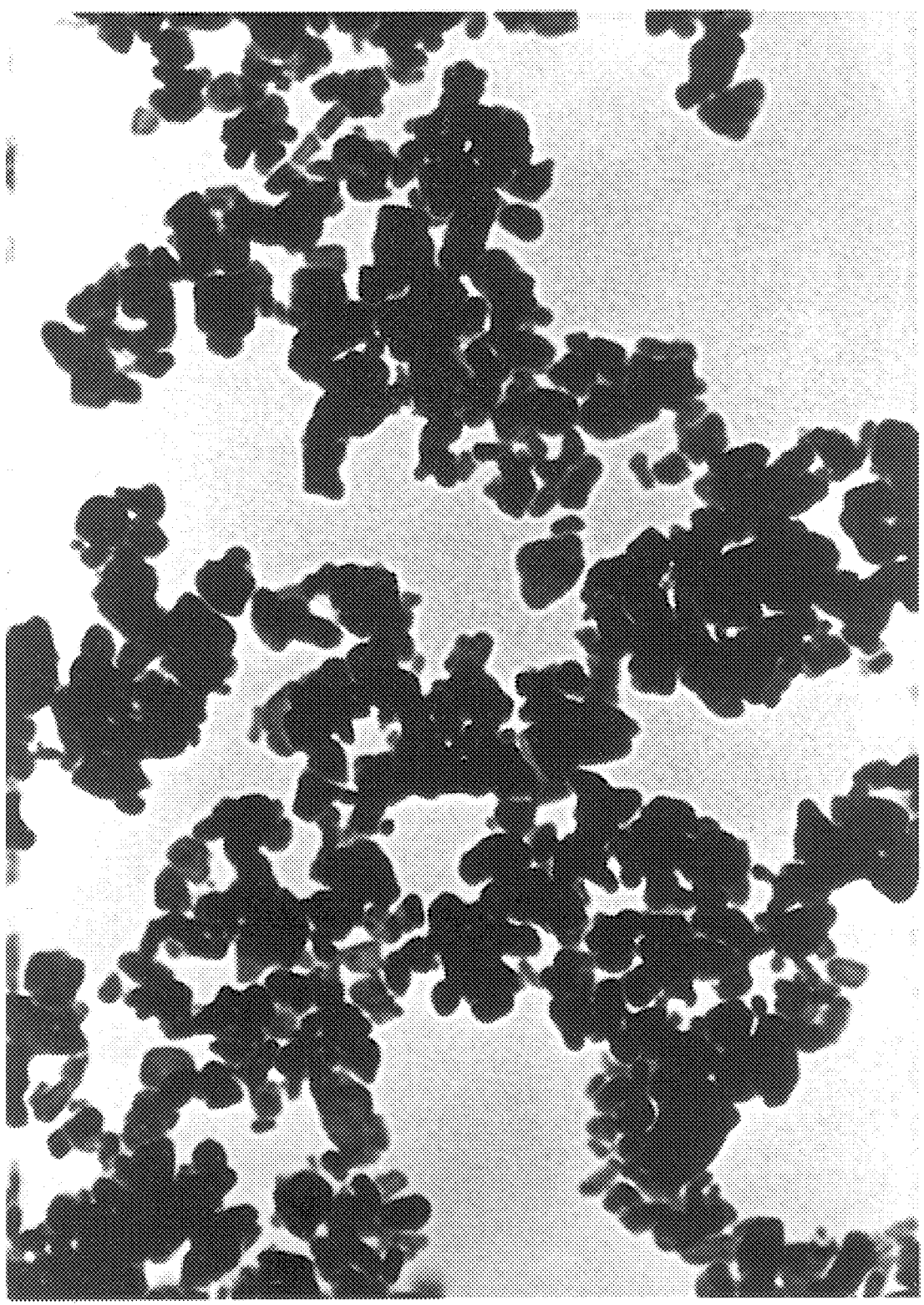
Figure 2:
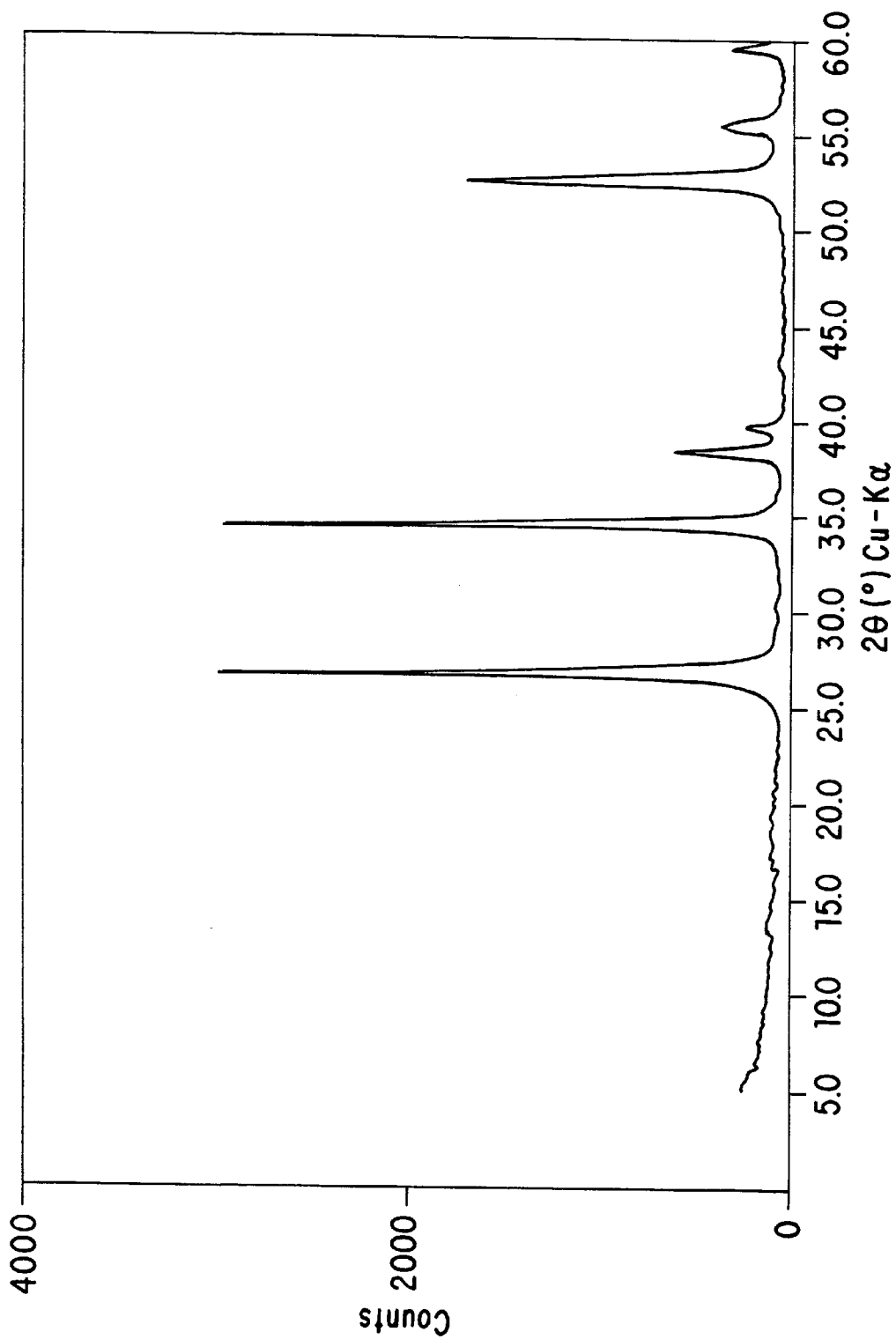
FIG. 2 is an X-ray diffraction spectra of the particles prepared in Example 5.

Regarding the production of the particles of the present invention, when the molar ratio of $ZnO/Sb_2O_5$ is less than 0.8 some non-reacted antimony oxide remains in the product mixture to form an undesirable mixture of zinc antimonate anhydride and antimony oxide. When the molar ratio of $ZnO/Sb_2O_5$ exceeds 1.2, the product becomes a mixture of zinc antimonate ($ZnSb_2O_6$) and zinc antimonate ($Zn_7Sb_2O_{12}$), which is also undesirable.

According to the invention, the mixing time of zinc compound and colloidal antimony oxide is in a range of from 6 minutes to 30 hours. Although a time of less than 6 minutes may not itself be undesirable, there is the possibility that mixing may be insufficient. Also, although a mixing time of longer than 30 hours may be acceptable, such a production time is longer than required and consequently inefficient. The mixing temperature range is from 0 to 100° C., below 0° C. being unfavorable owing to the freezing of antimony oxide sol. The temperature range can exceed 100° C., but when using antimony oxide sol there is a limitation on production equipment such as the need to use an autoclave etc.

In this invention, the calcining temperature of the dried mixture of zinc compound and antimony oxide sol, or the mixture of zinc compound with dried antimony oxide sol or with colloidal diantimony trioxide is in a range of from 500 to 1100° C. When the temperature is below 500° C., since a solid phase reaction does not occur and the particles of the present invention are not produced, this is unfavorable. When the temperature is above 1100° C., volatilization of the diantimony pentoxide tends to occur during the calcining step, and coarse particles tend to occur by sintering, therefore this is also unfavorable.

Production of a sol as a starting material

Production Example I 2630 grams of sodium antimonate was dispersed in 12000 grams of water, and 2570 grams of 35% HCl was added to the mixture under agitation, the mixture then being heated to 30° C. for 3 hours to cause the components to react. The yielded slurry of diantimony pentoxide gel was filtered by suction, poured 15000 grams of a 3.5% HCl aqueous solution, and further poured 54000 grams of water to rinse it. The obtained 2880 grams of diantimony pentoxide wet cake was dispersed in 10250 grams of water. 96 grams of 85% phosphoric acid was added to the suspension, which was then heated to 80° C. for 2 hours to perform peptizing. The resultant sol had properties such as a specific gravity of 1.132, a pH value of 1.75, viscosity of 2.3 c.p., $Sb_2O_5$ content of 12.8 wt. %, $P_2O_5$ of 0.45 wt. %, and $Na_2O$ of 0.02 wt. %. The particles in the sol were observed under a transmission electron microscope as having a particle size ranging from 10 to 20 nm, and the specific surface area thereof was determined by BET method to be 105 $m^2/g$.

Production Example II 1300 grams of Diantimony trioxide (produced by Mikuni Seiren Co., Ltd.) was dispersed in 5587 grams of water, and 953.7 grams of 35% hydrogen peroxide aqueous solution was added to the mixture, which was then heated to 90 to 100° C. to cause the components to react for 2 hours to obtain diantimony pentoxide sol. The obtained sol exhibited a specific gravity of 1.198, a pH value of 1.80, viscosity of 19.5 c.p., and $Sb_2O_5$ content of 18.4 wt. %. The particles in the sol were observed under a transmission electron microscope as having a particle size in of from 20 to 30 nm, and the specific surface area was determined by BET method to be 55.0 $m^2/g$.

Embodiment 1

1500 grams of water was added to dilute the 6000 grams of diantimony pentoxide sol (specific gravity of 1.132, $Sb_2O_5$ content of 12.8 wt. %) prepared in Production Example I. The mixture was then heated to 85° C. Then, 276 grams of basic zinc carbonate ($3ZnCO_3 \cdot 4Zn(OH)_2$, produced by the Sakai Chemical Industry Co., Ltd. and containing 70 wt. % when converted to ZnO) was added to the mixture under agitation. The mixture was further heated to 92° C. and agitated for 4.5 hours to prepare a slurry. The slurry contained 2.48 wt. % of ZnO and 9.87 wt. % of $Sb_2O_5$ and exhibited a $ZnO/Sb_2O_5$ molar ratio of 1.0. The slurry was then evaporated in a hot air circulation dryer at 150° C. to obtain a dried product. The dried product was analyzed by X-ray diffractometry, and it was found that the peak thereof matched the peak of diantimony pentoxide hydrate ($Sb_2O_5 \times H_2O$). The dried product was powdered in a mortar, and the resulted powder was calcined to 700° C. in an electric furnace for 4 hours. The obtained white gray powder was analyzed by X-ray diffractometry, and it was confirmed that the peak thereof matched the peak of zinc antimonate anhydride ($ZnSb_2O_6$). The powder was powdered by a Jet-O-Mizer to obtain a fine powder having an average particle size of 1.2 $\mu$m, determined by an apparatus for measuring particle size distribution by means of a centrifugal sedimentation method. The fine powder had a specific surface area of 10.4 $m^2/g$, determined by BET method, and the particle size calculated from the specific surface area was 89 nm. Observation by transmission electron microscope showed that the particles were colloidal particles having a square pillar shape with a primary particle size ranging from 50 to 150 nm.

Embodiment 2

400 grams of water was added to dilute the 1171.0 grams of diantimony pentoxide sol (specific gravity of 1.198, $Sb_2O_5$ content of 18.4 wt. %) prepared in Production Example II. 77.44 grams of basic zinc carbonate (produced by the Sakai Chemical Industry Co. Ltd. and containing 70 wt. % when converted to ZnO) was added to the mixture and mixed under agitation for 3 hours at room temperature (25° C.). The slurry contained 3.29 wt. % of ZnO and 13.07 wt. %, of $Sb_2O_5$ and exhibited a $ZnO/Sb_2O_5$ molar ratio of 1.0. The slurry was then dried by a spray dryer to obtain a dry powder. The dry powder was analyzed by X-ray diffractometry, and it was found that the peak matched the peak of diantimony pentoxide hydrate ($Sb_2O_5 \times H_2O$). The dried powder was calcined at 800° C. in an electric furnace for 12 hours. The obtained white gray powder was analyzed by X-ray diffractometry, and it was confirmed that the peak matched the peak of zinc antimonate anhydride ($ZnSb_2O_6$). The powder was milled by a pin-disc mill to obtain a fine powder having an average particle size of 1.5 $\mu$m, determined by an apparatus for measuring particle size distribution by means of a centrifugal sedimentation method. The fine powder had a specific surface area of 20 $m^2/g$, determined by BET method, and the particle size thereof calculated from the specific surface area was 46 nm. Observation by transmission electron microscope showed that the particles were colloidal particles having a square pillar shape and a primary particle size ranging from 30 to 100 nm.

Embodiment 3

3711 grams of diantimony pentoxide sol ($Sb_2O_5$ content of 18.4 wt. %) prepared in Production Example II was diluted by adding 3400 grams of water. 220.9 grams of basic zinc carbonate (made by Sakai Chemical Industry Co. Ltd. and containing 70 wt. % when converted to ZnO) was added to the mixture under agitation. The mixture was further heated to 95° C. and agitated for 6 hours to prepare a slurry. The slurry contained 2.11 wt. % of ZnO and 9.31 wt. % of $Sb_2O_5$, and exhibited a $ZnO/Sb_2O_5$ molar ratio of 0.90. The slurry was then evaporated in a hot air circulation dryer at 150° C. to obtain a dried product. The dried product was powdered in a mortar and calcined in an electric furnace at 620° C. for 12 hours to obtain a bluish green powder. The powder was analyzed by X-ray diffractometry, and it was found that the peak thereof matched the peak of zinc antimonate anhydride ($ZnSb_2O_6$)). The powder had a specific surface area of 35 $m^2/g$, determined by BET method, and the particle size calculated from the specific surface area was 26 nm. Observation by transmission electron microscope showed that the particles were colloidal particles having a square pillar shape and a primary particle size ranging from 20 to 50 nm.

Embodiment 4

3711 grams of diantimony pentoxide sol ($Sb_2O_5$ content of 18.4 wt. %) prepared in Production Example II was diluted by adding 3400 grams of water. 280.7 grams of basic zinc carbonate (produced by the Sakai Chemical Industry Co., Ltd. and containing 70 wt. % when converted to ZnO) was added to the mixture under agitation. The mixture was further heated to 95° C. and agitated for 4.5 hours to prepare a slurry, which contained 2.66 wt. % of ZnO and 9.24 wt. % of $Sb_2O_5$ and exhibited a $ZnO/Sb_2O_5$ molar ratio of 1.14. The slurry was then evaporated in a hot air circulation dryer at 150° C. to obtain a dried product. The dried product was powdered in a mortar and fired in an electric furnace at 620° C. for 12 hours to obtain a bluish green powder. The powder was analyzed by X-ray diffractometry, and it was found that the peak matched the peak of zinc antimonate anhydride ($ZnSb_2O_6$)). The powder had a specific surface area of 30 $m^2/g$, determined by BET method, and the particle size calculated from the specific surface area was 31 nm. Observation by transmission electron microscope showed that the particles were colloidal particles having a square pillar shape and a primary particle size ranging from 20 to 70 nm.

Embodiment 5

3600 grams of diantimony pentoxide sol ($Sb_2O_5$ content of 18.4 wt. %) prepared in Production Example II was diluted by adding 3000 grams of water. 238.1 grams of basic zinc carbonate (produced by the Sakai Chemical Industry Co., Ltd. and containing 70 wt. % when converted to ZnO) was added to the mixture under agitation. The mixture was further heated to 100° C. and agitated for 11 hours to prepare a slurry, which contained 2.44 wt. % of ZnO and 9.69 wt. % of $Sb_2O_5$ and showed a $ZnO/Sb_2O_5$ molar ratio of 1.0. The slurry was filtered by suction, followed by water rinsing to obtain a wet cake. The wet cake was then evaporated in a hot air circulation dryer at 150° C. to obtain a dried product. The dried product was powdered in a Henschel mixer to prepare a powder, which was analyzed by X-ray diffractometry, finding that the peak thereof matched the peak of diantimony pentoxide hydrate ($Sb_2O_5 \times H_2O$) and exhibited no other peaks. The obtained powder was calcined in an electric furnace at 630° C. for 13 hours to prepare a bluish green powder. The powder was analyzed by X-ray diffractometry, and it was found that the peak thereof matched the peak of zinc antimonate anhydride ($ZnSb_2O_6$). The molding press-formed the powder under 100 $kg/cm^2$ pressure was indicated conductivity with a specific resistivity of 100 $\Omega cm$. The 118 grams of powder was added to 400 grams of water and dispersed with glass beads (2–3 mm in diameter) in a ball mill for 96 hours, whereafter the glass beads were separated to obtain an aqueous sol of 1131.2 grams, consisting of particles having a crystalline structure of zinc antimonate anhydride. The obtained aqueous sol was concentrated to 522 grams in a rotary evaporator. The obtained concentrated aqueous sol had a transparent bluish green color and a specific gravity of 1.228, a pH value of 8.32, viscosity of 2.0 c.p., conductivity of 411 $\mu s/cm$, and $ZnSb_2O_6$ content of 22.6 wt. %. The sol was stable for one month at a temperature of 50° C. The sol was observed under a transmission electron microscope (refer to FIG. 1) and exhibited a primary particle size in a range of from 10 to 50 nm. A photometer for measuring particle size distribution by means of a light-scattering method showed the particle size to be 97.5 nm, and an apparatus for measuring particle size sedimentation by a centrifugal sedimentation method measured the particle size as 70 nm. The specific surface area of the dried product of the sol measured by BET method was 37.6 $m^2/g$, and the particle size calculated from the specific surface area was 25 nm.

Embodiment 6

Figure 3:
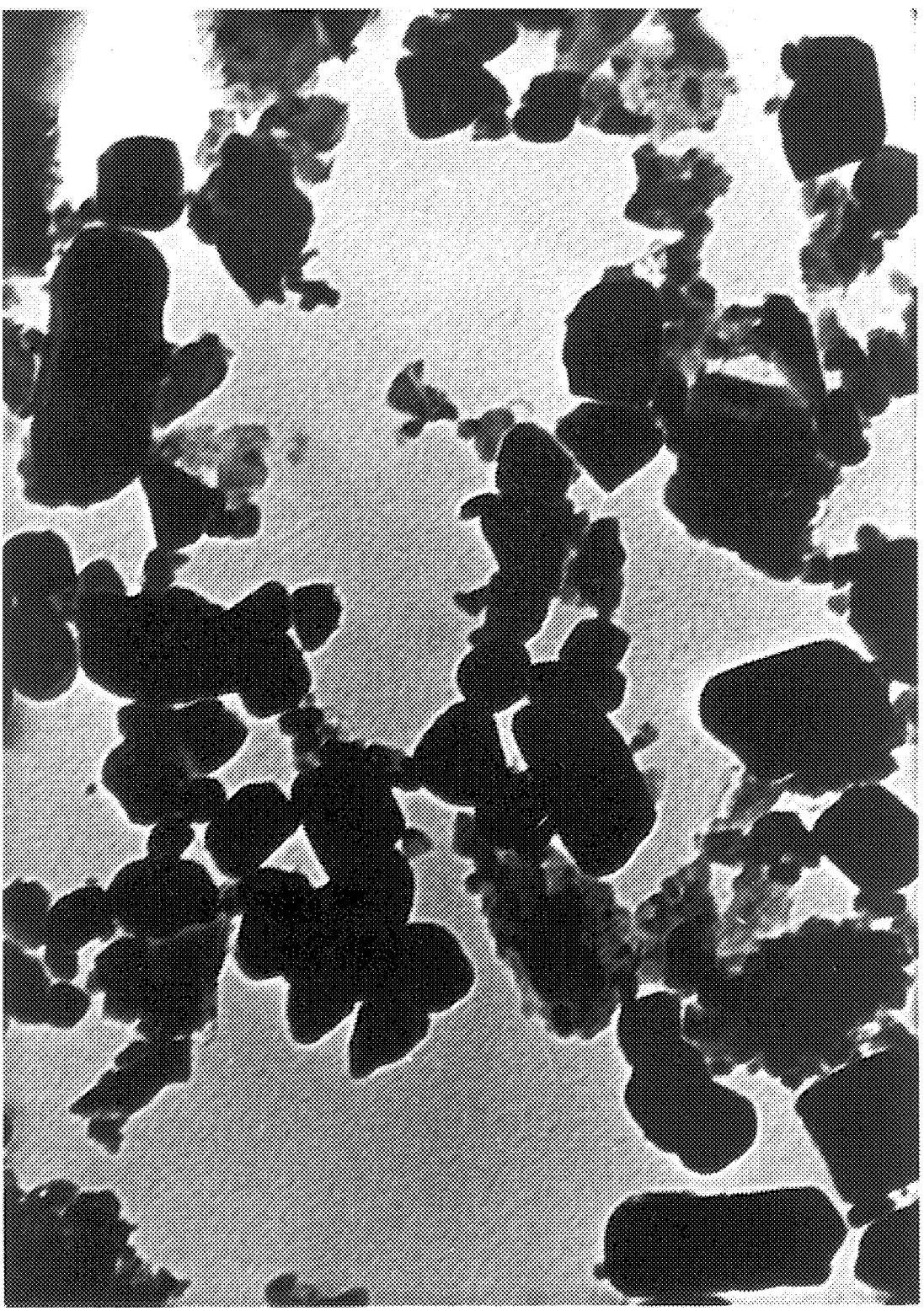
FIG. 3 is a photograph of particles prepared in Example 6, taken by a transmission electron microscope with a magnification of 200,000.
Figure 4:
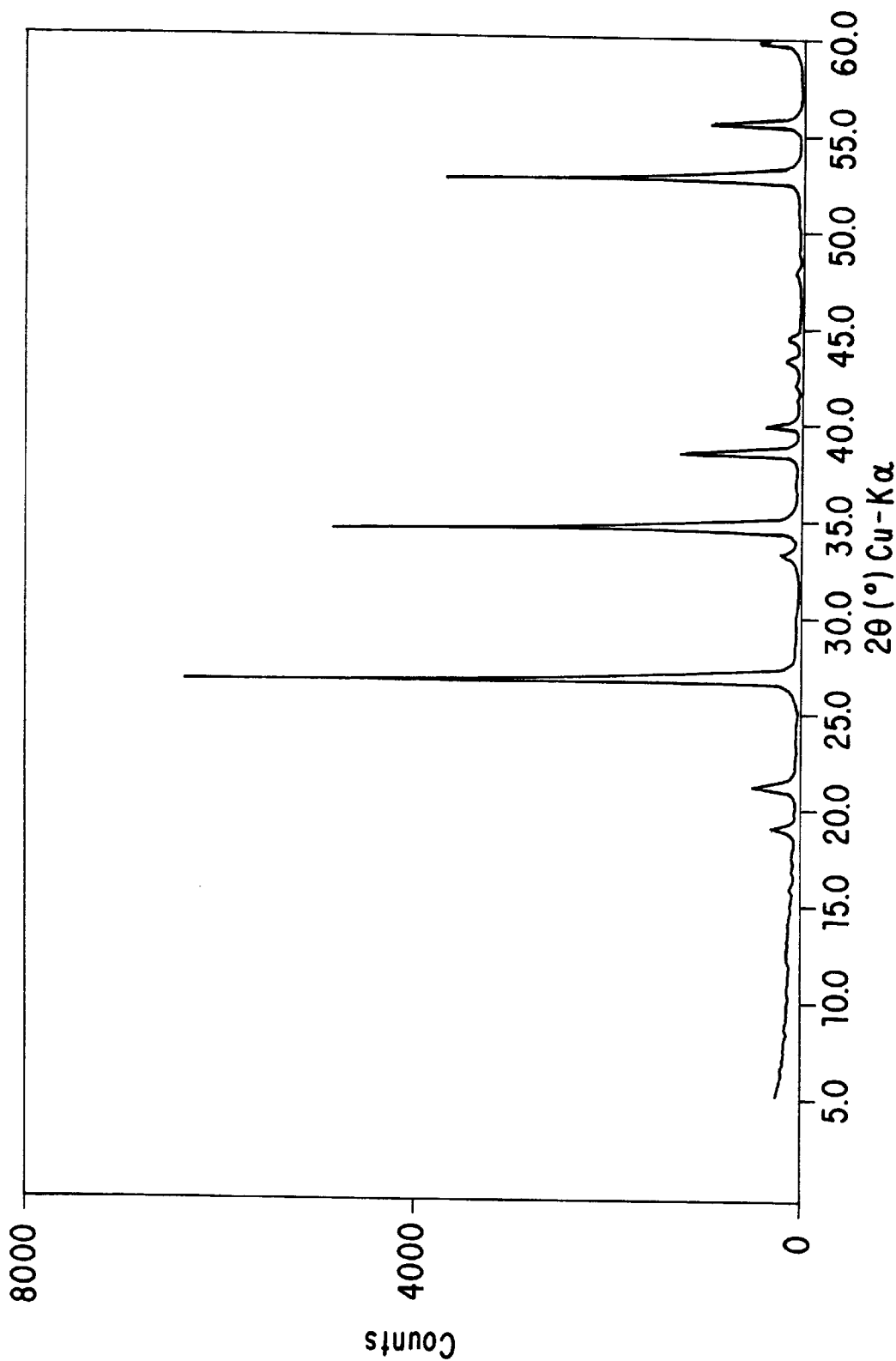
FIG. 4 is an X-ray diffraction spectra of the particles prepared in Example 6.

Diantimony pentoxide sol prepared in Production Example II was dried by a spray drier. 385.6 grams of the dried diantimony pentoxide (containing 90 wt. % of $Sb_2O_5$) was mixed with 125.2 grams of basic zinc carbonate (produced by the Sakai Chemical Industry Co., Ltd. and containing 70 wt. % when converted to ZnO) in a V-shaped mixer for 30 minutes. The mixture had a $ZnO/Sb_2O_5$ molar ratio of 1.0. The mixture was then calcined in an electric furnace at 700° C. for 8 hours to obtain a white powder, which was analyzed by X-ray diffractometry, confirming that the peak matched the peak of zinc antimonate anhydride ($ZnSb_2O_6$). The powder was milled in a pin-disc mill to obtain a fine powder having an average particle size of 1.2 $\mu m$ (determined by an apparatus for measuring particle size distribution by means of centrifugal sedimentation). 150 grams of the fine powder was added to 450 grams of water and dispersed with glass beads (2–3 mm in diameter) in a ball mill for 120 hours. Then the glass beads were separated to obtain an aqueous sol of 1300 grams consisting of particles having a crystal structure of zinc antimonate anhydride. The obtained aqueous sol had a white color and a specific gravity of 1.100, a pH value of 5.58, viscosity of 3.1 c.p., conductivity of 1450 $\mu s/cm$, and $ZnSb_2O_6$ content of 11.5 wt. %. The sol was observed by a transmission electron microscope (refer to FIG. 3), confirming a primary particle size in a range of from 20 to 100 nm. A photometer for measuring particle size distribution by means of a light-scattering method indicated a particle size of 432 nm, and an apparatus for measuring particle size distribution by means of a centrifugal sedimentation method indicated a particle size of 280 nm. The sol exhibited a specific surface area of 25 $m^2/g$, determined by BET method, and the particle size calculated from the specific surface area was 37 nm.

Comparative Example 1

The pre-calcined powder prepared in Embodiment 2 was calcined in an electric furnace at 450° C. for 15 hours to obtain a yellow powder. The powder was observed by X-ray diffractometry, confirming that the peak thereof matched the peak of diantimony pentoxide ($Sb_2O_5$), and no generation of zinc antimonate anhydride was observed.

Comparative Example 2

The diantimony pentoxide sol ($Sb_2O_5$ content of 18.4 wt. %) prepared in Production Example II was diluted with 400 grams of water. 54.2 grams of basic zinc carbonate (made by the Sakai Chemical Industry Co., Ltd. and containing 70 wt. % when converted to ZnO) was added to the mixture under agitation. The mixture was agitated at 95° C. for 6 hours to prepare a slurry, which had a ZnO content of 2.33 wt. %, $Sb_2O_5$ content of 13.3 wt. %, and $ZnO/Sb_2O_5$ molar ratio of 0.70. The slurry was evaporated in a hot air circulation drier at 150° C. to obtain a dried product. The dried product was pulverized in a mortar and calcined in an electric furnace at 800° C. for 12 hours to obtain a white gray powder. The powder was analyzed by X-ray diffractometry, indicating peaks of zinc antimonate anhydride ($ZnSb_2O_6$) and diantimony tetroxide ($Sb_2O_4$), generated by deoxidation of excess diantimony pentoxide, and confirming that the product is a mixture of these two compounds.

Comparative Example 3

58.8 grams of Diantimony trioxide (a commercial product of Lucette Inc., grade white, specific surface area of 1.0 $m^2/g$ determined by BET method, primary particle size of 0.6 μm) was mixed with 16.3 grams of zinc oxide (made by the Sakai Chemical Industry Co., Ltd., Zinc white No. 1, specific surface area of 4.2 m$^2$/g determined by BET method, primary particle size of 0.5 μm) in a mortar. The mixture was calcined in an electric furnace at 700° C. for 12 hours to obtain a partly sintered white gray powder. The powder was observed by X-ray diffractometry and it was found that the peak matched the peak of zinc antimonate anhydride (ZnSb$_2$O$_6$). However, the specific surface area of the powder determined by BET method was 1.0 m$^2$/g, and the primary particle size calculated from the specific surface area was 920 nm.

The particle of this invention is fine particle having a primary particle size in a range of from 5 to 500 nm, and the fine particle has a ZnO/Sb$_2$O$_5$ molar ratio in the range of from 0.8 to 1.2 and a crystal structure of zinc antimonate anhydride (ZnSb$_2$O$_6$).

The zinc antimonate anhydride of this invention functions as a flame retardant originating from diantimony pentoxide. When the zinc antimonate anhydride is used with an organic halide along with an olefin resin such as polyethylene and polypropylene, styrene resin such as polystyrene, anti-shock polystyrene, acrylonitrile-styrene resin, and acrylonitrile-butadiene-styrene resin (ABS resin), acrylic resin, polycarbonate, polyester such as polyethyleneterephthalate and polybutyleneterpolyacetal, polyacetal, polyphenyleneoxide, polysulfone, thermoplastic resin such as polyamide, epoxy resin, phenol resin, thermosetting resin such as unsaturated polyester resin, and polyurethane resin, or when the zinc antimonate anhydride is added to halogen-containing vinyl resin, modacrylic fiber, or polyvinylchloride fiber, these resins become flame retardant materials.

In addition, the particle of this invention functions as a smoke suppressant originating from zinc oxide for halogen-containing resin. Since the particle of this invention has electrical conductivity, they can be used as an antistatic agent of plastic forms and films, plastic fibers, glass, and papers. In particular, since the sol consisting of the particles of this invention has high transparency, it can be used as a transparent antistatic agent, a hard coat agent of high reflective index, or anti-reflection agent when used along with a part-hydrolyzed liquid of silane coupling agent, hydrolyzed liquid of ethylsilicate or methylsilicate, or mixed with a resin emulsion or ultraviolet curing resin. Since the sol has electrical conductivity, it can be used as an electrical viscous fluid by dispersing it into silicone oil or the like. It can also be used as a ceramic resistor. The particle of this invention has a primary particle size in the range of from 5 to 500 nm, and in particular the sol thereof has a dispersion characteristic very close to individual primary particle. Accordingly, the sol can be used as a surface treating agent for metals, particularly as a corrosion inhibitor for zinc-coating steel sheets when mixed with chromium chromate aqueous solution, or an organic resin liquid, and as a micro-filler for oxide dispersion zinc coating. The sol is also applicable as a treatment agent for papers and fibers, and as a non-flammable paint. The particle of this invention is also used as a micro-filler for composites of metals, plastics, and ceramics.

What is claimed is:

1. A coating agent comprising:
   (a) a particle of zinc antimonate anhydride, wherein said particle has a ZnO/Sb$_2$O$_5$ molar ratio in a range of from 0.8 to 1.2 and has a crystal structure of zinc antimonate anhydride (ZnSb$_2$O$_6$) and wherein said particle has a primary particle size in a range of from 5 to 500 nm; and
   (b) a member selected from the group consisting of a liquid of a part-hydrolyzed silane coupling agent, a liquid of a hydrolyzed ethylsilicate, a liquid of a hydrolyzed methylsilicate, and a resin emulsion.

2. The coating agent according to claim 1, wherein the coat agent is an antistatic agent, a hard coat agent of high refractive index, or an antireflective agent.

3. The coating agent according to claim 1, wherein said particle is electroconductive.

4. The coating agent according to claim 3, wherein said particle has a resistivity ranging from 0.1K Ω to 1M Ω.

* * * * *